Patented Sept. 13, 1938

2,130,211

UNITED STATES PATENT OFFICE 2,130,211

TINNING COMPOUND

Morris M. Savedoff, Brooklyn, N. Y.

No Drawing. Application December 19, 1936,
Serial No. 116,714

3 Claims. (Cl. 134—24.5)

This invention relates generally to soldering processes and is more particularly directed to a method and medium for preparing surfaces for the application of solder thereto, as so-called tinning.

As is well known, satisfactory results in the use of solder, especially where it is to be associated with a ferrous metal, are largely dependent upon the preparation of the surface to which the solder is to be applied and the characteristics of the material that is employed for conditioning the surfaces to cause the solder to adhere thereto. This is particularly true in those arts where it is the practice to utilize solder as a medium for filling indentations or depressions in various types of surfaces to build them up to their original contour or configuration. For example, indentations or depressions in bodies and other parts of automotive vehicles resulting from collision and other impacts, which are not readily accessible for treatment by the usual pressure or other methods customarily resorted to in the elimination of the damaged areas are filled with solder to conceal them and restore the marred surface to its original appearance of continuity.

In the filling of indentations or depressions with solder, especially in automotive vehicle repair work, considerable difficulty heretofore has been experienced in obtaining a proper and permanent bond between the solder and the surface to which it is applied. Various compounds have been employed in the form of solutions or of a plastic or paste consistency, but because of their characteristics satisfactory results have been more or less difficult of attainment. In some instances, the type of material used in the tinning operation requires preliminary preparation of the surface to be repaired or restored, with the attendant additional labor costs, while in others, especially where a solution is utilized, it is difficult to confine it to the area to which the solder is to be applied, apart from the possibility that the solder which, in these filling operations, is usually sprayed upon the surface under treatment, will spread and produce an unsightly job which will require considerable dressing or finishing before it is completed. On the other hand, the so-called paste types of tinning compounds are usually of a consistency which makes them little better than the solutions and they lack those characteristics which are essential to the expeditious and economical performance of the work in hand and the production of a clean and permanent union of the solder with the harder metal upon which it is superposed.

From the foregoing, it will be manifest that while the advantages flowing from the use of solder in restoring indented or depressed surfaces to their original appearance are recognized, its use has been more or less limited because of the fact that the methods followed with the materials now available for conditioning the surface to be treated to form a bond with the solder, fail to provide a means for utilizing the solder build-up process in an economical, expeditious and efficient manner.

Therefore, the primary object of this invention is to increase the field of utility of solder generally and especially as it may be employed in the so-called spraying processes, wherein the molten alloy is discharged under air pressure to impinge upon the surface to which it is to adhere.

More specifically, it is the object of this invention to provide a tinning or surface conditioning material for use in soldering operations, which may be economically produced and readily applied, even by the unskilled, to the surfaces with which the solder is to be associated, the material possessing characteristics which will insure a positive and permanent bond between the solder and the supporting metal upon which it may be superimposed, as by spraying or otherwise.

Another object of this invention is to provide a compound of a paste-like consistency for conditioning a surface for the reception of solder, which may be applied to the surface to which the solder is designed to adhere, by a simple spreading operation, as by brushing, the compound including ingredients which are especially effective in causing the solder to permanently adhere to ferrous metal surfaces.

Further, it is the object of this invention to provide a tinning compound or similar surface conditioning material for use in conjunction with solder applying processes, that will retain its essential characteristics over long periods of time, the compound being of a nature whereby its salient properties may be readily revivified or renewed after apparent deterioration, as where solidification occurs from undue exposure to the atmosphere, or otherwise.

Other objects and advantages flowing from the use of my invention in practicing various soldering processes, will become apparent as the description proceeds and I would have it clearly understood that I reserve unto myself all rights to the full range of equivalents thereof, and to such avenues of use as may not be herein specifically set forth, as falling within the scope of this disclosure.

For the purposes hereof, I have elected to describe a preferred method of producing and utilizing my invention. This, however, is not to be construed, in any sense, as restricting my invention, which may take other forms and be otherwise employed, within the purview of the appended claims.

For use in so-called tinning operations, I prefer to produce my invention in the form of a paste of a consistency which will admit of its application to the surface which is to receive the solder, by means of a brush. This, of course, may be variously accomplished, as by any suitable manual or mechanical media, whereby the materials which enter into its composition may be appropriately proportioned and properly mixed, as hereinafter set forth.

In producing my tinning compound, I first provide a vehicle in the form of a solution composed of water, copper sulphate and sulphuric acid. This solution is added to silica powder, preferably a little at a time, the mass meanwhile being stirred or agitated and ground, until it assumes the characteristics of a liquid paste. Gum arabic, which functions as an emulsifying agent, is next added to the mass into which the silica powder has been thoroughly worked, and agitated in a grinding and stirring operation to increase the consistency of the mass until it approximates that of a gummy paste. To this mixture is now added the final ingredient, which is mercury, the mixture again being stirred and ground continuously while the mercury is being added, until it is saturated with the mercury.

It will be understood that my tinning compound may be produced in any desired quantities, the relative proportions of the different ingredients being varied accordingly. As an example, assuming that it is desired to produce one pound of the compound, to approximately two ounces of the aforesaid vehicle solution, I add about eight ounces of the silica powder and stir into the resulting mass about one ounce of the emulsifying agent, the mercury making up the balance of the ultimate quantity of the compound.

In the use of my tinning compound, the surface to be treated is cleaned and the compound is then applied thereto by means of a brush, the surface being completely covered after which the application is permitted to set for a brief interval, and then rubbed over or wiped with a dry cloth or sponge, leaving an overlying deposit of mercury upon the treated surface. Due to the action of the sulphuric acid, in the compound, the mercury readily amalgamates with the metal upon which it is precipitated and when the solder is applied, the strong affinity of the mercury for the solder produces a bond between the supporting surface and the solder which will give the finished work the characteristics of an integral structure, it being evident that the copper sulphate functions to clean the surface to which the paste is applied and also serves as a flux in the union of the unlike metals.

In lieu of the silica powder, emery powder may be used as a base material, while other gums or molasses, oil or sugar may be substituted for the gum arabic as the emulsifying agent. However, in order to attain the important objectives to which my invention is directed, it is essential that the mercury be kept free so that it may precipitate freely in the application of the tinning compound to the surface under treatment.

I have found that my paste-like compound or composition remains in usable condition for long periods of time, when packed in a sealable container, as a jar with a so-called screw cover. In those instances, however, where it may harden or solidify, through exposure to the atmosphere, its paste-like qualities may be readily restored by adding a sufficient quantity of solvent containing the liquid ingredients of the compound hereinbefore referred to, the characteristics of the mercury being unaffected by the solidification or partial solidification of the compound and its restoration to its paste-like consistency. Obviously, this is an important attribute of my compound, especially from the standpoint of economy to the user.

While I have described my invention more or less specifically, as regards its use in a particular soldering process, it will be apparent that the paste-like material possesses a wide range of utility, as a tinning medium or for preparing a metal surface or surfaces, to which solder is to be applied to form a bond therewith.

I claim:

1. A tinning compound consisting of a solvent of water, copper sulphate and sulphuric acid, a base of silica powder, gum arabic as an emulsifying and oxidation retarding agent and mercury mixed to a paste-like consistency.

2. A tinning compound composed of a solvent of water, copper sulphate and sulphuric acid, silica powder, gum arabic and mercury, mixed to a paste-like consistency, the solvent constituting approximately 12% of the mixture, the powder 50%, the gum arabic 6% and the mercury 32%.

3. A tinning compound having a paste-like consistency, composed of one-half pound of a base-forming powder, two to three ounces of a solution of water, copper sulphate and sulphuric acid, an ounce of gum arabic as an emulsifying and oxidation retarding agent and approximately five ounces of mercury.

MORRIS M. SAVEDOFF.